March 12, 1974  U. BAENSCH  3,796,812
FISH FEED, ESPECIALLY FOR PET FISH
Filed Dec. 23, 1971
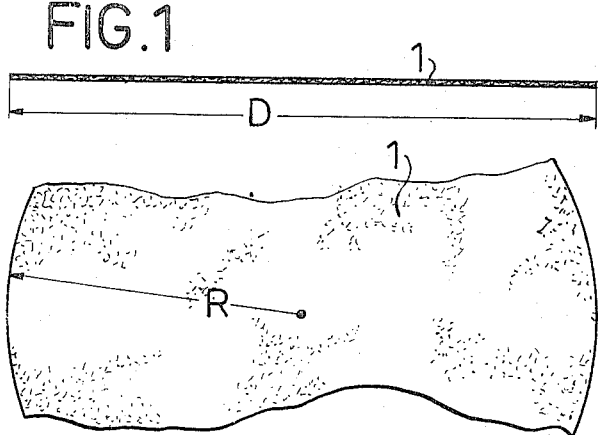
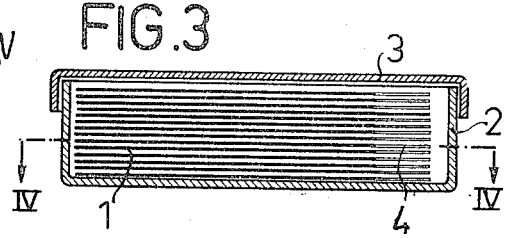
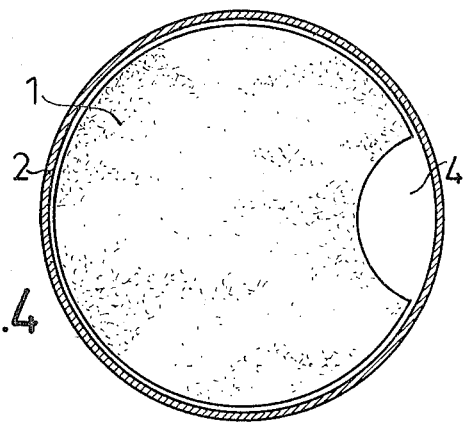
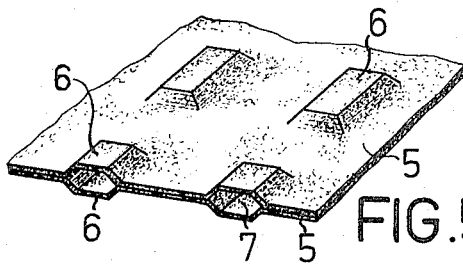
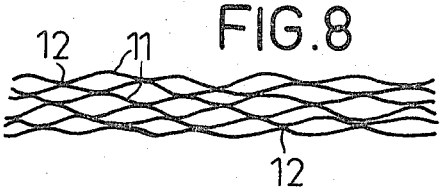
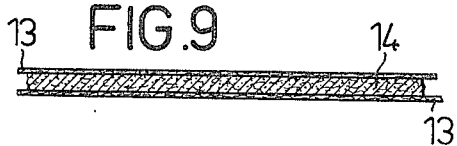
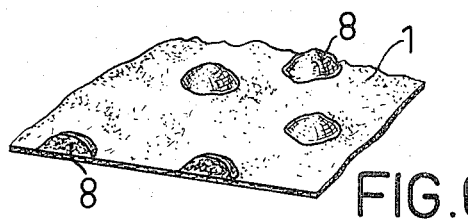
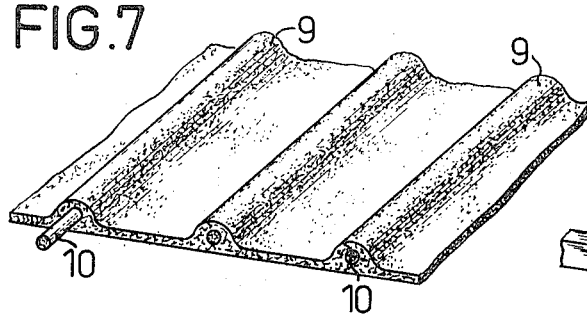
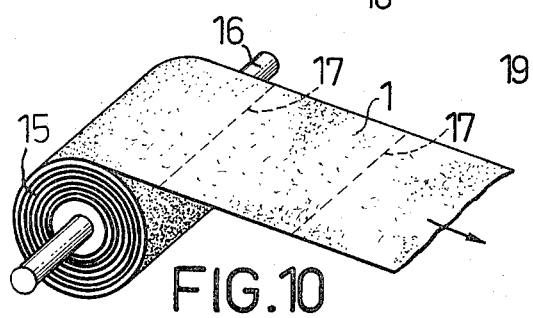
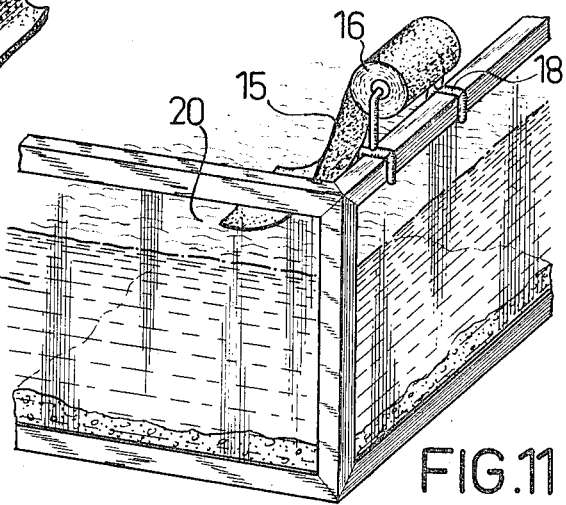

United States Patent Office 3,796,812
Patented Mar. 12, 1974

3,796,812
FISH FEED, ESPECIALLY FOR PET FISH
Ulrich Baensch, 70 Herrenteich, 452 Melle,
Federal Republic of Germany
Filed Dec. 23, 1971, Ser. No. 211,179
Claims priority, application Germany, Dec. 24, 1970,
P 20 63 814.6
Int. Cl. A23k 1/18
U.S. Cl. 426—62                                     1 Claim

ABSTRACT OF THE DISCLOSURE

Fish feed, especially for pet fish with thin-walled feed bodies of crushed feed particles held together by a binding agent, said feed bodies being formed by sheets having a surface in excess of three square centimeters.

---

The invention relates to a fish feed, especially for pet fish, with thin-walled feed bodies of crushed feed elements held together by a binding agent.

With heretofore known fish feed of the type involved, the thin-walled feed bodies are formed by flakes of irregular shape which is measured out quantity are fed in greater numbers. As a rule, the size of these flakes amounts to a fraction of a square centimeter. This feed which generally has proved satisfactory, has the drawback that a feed concentration at a certain area within the water or in an aquarium can practically not be realized. Thus, the possibility that feed bodies are not consumed, but perish, exists to a considerable extent whenever an overdosing has been effected.

It is, therefore, an object of the present invention to avoid the above mentioned drawback.

It is another object of this invention to provide a fish feed of the above outlined general type which will permit a comparatively precise dosing out and in the case of an overdosing will permit even the possibility of removing the excessive quantities of feed.

These and other objects and advantages of the invention will appear more clearly from the following specification, in connection with the accompanying drawing, in which:

FIG. 1 is a longitudinal section through a portion of a feed body, according to the invention.

FIG. 2 is a top view of the feed body of FIG. 1.

FIG. 3 is a section through a can with feed bodies therein.

FIG. 4 represents a section taken along the line IV—IV of FIG. 3.

FIGS. 5, 6 and 7, illustrate sections through and isometric views of different feed bodies respectively, of the present invention.

FIGS. 8 and 9 are cross sections through further modified feed bodies according to the invention.

FIG. 10 is an isometric view of feed bodies forming a continuous band and wound up to form a roll.

FIG. 11 illustrates a roll of feed bodies mounted on an aquarium tank.

The fish feed according to the present invention, is characterized primarily in that the feed body is formed by at least one flexible sheet or film having a surface in excess of three square centimeters. Advantageously, the feed body is formed by flexible sheets having a surface in excess of three square centimeters, but expediently less than one-hundred square centimeters. Particularly suitable for aquariums are sheet sizes of from fifty to sixty square centimeters, while, of course, the shape of such sheets may be square, round, or rectangular, or of any other configuration which can be easily manufactured. However, the present invention is not limited to a specific configuration of the feed bodies, so that, if desired, also irregularly shaped feed body sheets may be employed.

These flexible sheets, due to their size, have the advantage that relatively large feed quantities can be concentrated at one area in the aquarium. They will be located by the fish without difficulties and will be eaten by the fish one section after another. The sheets, due to their thin-walled thickness and their low weight can float on the top of the water, so-to-speak, as cover, but may also float within the water, while being able to adopt the shape of a slowly moving web. In addition thereto, these sheets have such a strength that they do not disintegrate in the water, and non-eaten residues can easily be recognized and can be removed by hand or with a tool from the water of the aquarium.

It is, of course, also possible to break up the sheets into smaller pieces prior to feeding the same, which may be desired, especially with very small fish. At any rate, the fact that the feed comes in sheet form makes possible an improved dosing.

The sheet form of the feed has the additional advantage that the feed can be easier packaged and the packaging can be so selected that it takes into consideration the contour of the sheets. Thus, if the sheets are round, round boxes or cans can be used as packaging material, whereby a highly satisfactory employment of the available packaging space can be realized.

Referring now to the drawing in detail, the feed body 1 is composed of feed elements which have been obtained by crushing suitable feed material. These feed elements are then held together by a binding agent. The feed bodies 1 form sheets and have a wall thickness W which is very thin in comparison to the diameter D or radius R of the circular feed bodies 1 shown in FIGS. 1 and 2. The diameter of such circular feed body sheets advantageously amounts to approximately from seven to eight centimeters so that a surface of from approximately forty-nine to sixty-four square centimeters will be obtained. The wall thickness W is preferably selected within the range of 0.1 to 1.0 millimeter.

The binding agent and the feed particles and the binding therebetween are such that a strip of the feed body having a width of one centimeter has a tear resistance of approximately seventy grams. Moreover, the feed body 1 is highly flexible so that it can be rolled up into a roll and within the water can bend while the fish are feeding thereon so that a fan-like luring movement of the feed body 1 occurs.

The above mentioned tear resistance which is measured in dry condition of the feed body 1 is within the water so low that a tearing and diminuating by the fish will be possible without difficulties while on the other hand a disintegrating within the water by softening cannot occur. Thus, the feed body 1 retains its original configuration and does not become brittle or disintegrates merely in view of the effect exerted by the water. Consequently, the feed body 1 will be easily recognized by the fish when its floats on the water or within the water and, of course, is also easily recognized by the owner of the aquarium. For storing the feed bodies 1, a cylindrical can 2 may be employed which has a cover 3 and has an inner diameter corresponding to the diameter D of the feed body 1. The feed bodies 1 are stored in the can 2 while lying closely one upon the other. In order to facilitate the withdrawal of the feed bodies 1 from the can 2, the feed body 1 may be provided with a cutout into which a finger can be inserted to lift the respective feed body out of the can. Such cutout is shown in FIG. 4 as a sickle-shaped cutout 4.

It is, of course, not necessary under all circumstances that the feed body 1 has a plane smooth surface. Thus, according to FIG. 5, two feed bodies 5 may be connected to each other and may be provided with corresponding elevations and depressions so as to form hollow spaces 7 which will improve the buoyancy of the feed body. Of course, if desired, only one layer or one feed body 5 may be provided with depressions 6 and the other feed body 5 may be plane.

According to FIG. 6, the sheet-like flexible feed body 1 may be provided with additional feed parts 8 adhering thereto and having a height considerably greater than the thickness W. As feed particles there may be employed, for instance, small insects, organisms, or the like, which have been dried or pretreated in any suitable way and which are arranged in spaced relationship to each other on the feed body 1. Instead of the feed elements 8, also other substances, for instance, medicines may be employed.

According to FIG. 7, the feed bodies 1 are provided preferably with ribs 9 which are parallel to each other and serve for enveloping or embedding strand-shaped bodies 10 which may consist of materials of which the above mentioned feed elements 8 are made or consist.

According to FIG. 8, the feed bodies 11 do not have a plane surface but are irregularly or are regularly undulated while superimposed feed bodies 11 may be interconnected at the contacting points 12 by suitable adhesive means. The thus formed hollow spaces increase the buoyancy of the feed bodies. Furthermore, in this way, a certain consolidation or strengthening of the feed bodies is obtained which may be desirable when the feed bodies are intended for feeding larger fish. Such strengthening by a sandwich formation is also obtained with the embodiment shown in FIG. 9, according to which the two outer layers are formed by feed bodies 13, whereas the intermediate layer 14 may consist of feed particles, but may also merely serve for increasing the buoyancy or the spacing of the two outer layers.

According to the embodiment of FIGS. 10 and 11, the feed bodies 1 have been aligned to form a band 15 which is wound onto a core 16 so that the feed bodies 1 may be withdrawn therefrom in smaller or larger sizes, the smaller size being marked by a perforation 17. According to FIG. 11, the core 16 is, by holding means 18, rotatably connected to an aquarium 19 in such a manner that the band 1 formed by the feed bodies 1, freely hangs down onto the surface 20 of the aquarium water. That portion of the band 15 which lies on the water surface 20 is available as feed to the fish. By tearing or sucking on this portion lying on the water, the fish automatically pull off more of the roll. By means of this device it is possible to assure the feeding of the fish over a greater period of time. If desired, with the arrangement of FIG. 11 a perforation 17 may be omitted.

The strips or ribs 9 may be formed by specially prepared or colored feed or feed particle mixtures. It is furthermore possible to provide the core 16 with a drive, for instance, in the form of a small electric motor adapted to be controlled by a time relay or time switch.

It may also be pointed out that the feed according to the invention is also suitable for such type of fish which prefer large coherent pieces and are not satisfied with feed which comes in commercially available flakes. Frequently, many fish are confused by the plurality of invidual flakes, as is the case with larger predator fish which are irritated by a school of smaller feed fish. Also, the predator pursues his victims only when he succeeds to separate an individual fish, in most instances, a larger fish, from the school.

There will now be described by way of example, a composition of a feed body 1, according to the invention.

EXAMPLE

40% of finely ground dry fish, 15% of beef liver powder, 15% of oatmeal, 10% of rice meal, 5% carrot powder, 5% of egg yolk powder, 3% of beer yeast, 2% of wheat germ powder, 2% of Algipon (Na-alginate), 1% of gelatin, 1% of agar agar, and 1% of cod liver oil. Oatmeal, rice meal, gelatin, and agar agar serve both as nutrient and as binding agent.

It is, of course, to be understood that the present invention is, by no means, limited to the specific example set forth above and/or the showing in the drawing, but also comprises any modifications within the scope of the appended claim.

What I claim is:

1. Fish feed, especially for pet and decorative fish, which includes crushed particles connected together so as to form flexible foil sheet material with a minimum top surface area of approximately 3 square centimeters, the sheet material having a top surface area of from 3 to 100 square centimeters, and a web-shaped feed body homogeneous through and through having feed particles in spaced relationship to each other connected to and distributed over said web-shaped feed body, said sheet material including individual sheets adapted to be placed one upon the other, said crushed particles including specifically 40% of finely ground dry fish, 15% of beef liver powder, 15% of oatmeal, 10% of rice meal, 5% carrot powder, 5% of egg yolk powder, 3% of beer yeast, 2% of wheat germ powder, 2% of Algipon (Na-alginate), 1% of gelatin, 1% of agar agar, and 1% of cod liver oil, said oatmeal, rice meal, gelatin, and agar agar simultaneously serving both as nutrient and as binding agent.

References Cited
UNITED STATES PATENTS

| | | | |
|---|---|---|---|
| 2,904,436 | 9/1959 | Auerbach | 99—3 |
| 2,358,320 | 9/1944 | Eisaman | 99—3 |
| 390,084 | 9/1888 | Lane | 242—55.2 |
| 3,017,317 | 1/1962 | Voigtman et al. | 162—111 |
| 2,874,048 | 2/1959 | Walldov | 99—3 |

NORMAN YUDKOFF, Primary Examiner

C. P. RIBANDO, Assistant Examiner

U.C. Cl. X.R.

426—115, 108, 210, 212